United States Patent [19]
Rehfeld

[11] Patent Number: 5,773,102
[45] Date of Patent: Jun. 30, 1998

[54] SOUNDPROOFING LAMINATED GLASS PANE

[75] Inventor: Marc Rehfeld, Ezanville, France

[73] Assignee: Saint-Gobain Vitrage, S.A., Courbevoie, France

[21] Appl. No.: 710,328

[22] Filed: Sep. 16, 1996

[30] Foreign Application Priority Data

Sep. 15, 1995 [FR] France ................................... 95 10837

[51] Int. Cl.$^6$ ...................................................... B32B 9/00
[52] U.S. Cl. .............................. 428/34; 428/13; 428/212; 428/215; 428/425.6; 428/430; 428/441; 296/96.14; 52/788; 52/788.12
[58] Field of Search ............................ 428/215, 34, 415, 428/426, 425.6, 430, 417, 212, 213, 332, 441, 220, 13; 296/96.14; 52/788, 788.12; 181/289, 290, 286

[56] References Cited

U.S. PATENT DOCUMENTS

| | | |
|---|---|---|
| 3,718,535 | 2/1973 | Armstrong et al. . |
| 4,614,676 | 9/1986 | Rehfeld . |
| 5,340,654 | 8/1994 | Ueda et al. . |
| 5,368,917 | 11/1994 | Rehfeld et al. . |
| 5,478,615 | 12/1995 | Refheld et al. . |

*Primary Examiner*—Patrick Ryan
*Assistant Examiner*—Abraham Bahta
*Attorney, Agent, or Firm*—Oblon, Spivak, McClelland, Maier & Neustadt, P.C.

[57] ABSTRACT

A soundproofing laminated glass pane comprising at least two transparent rigid sheets, at least one plastic film, and at least one film having ordinary acoustic performance, provides acoustic results just as good as the plastic film alone. The two films may be separated by an impermeable thin film, such as polyethylene terephthalate.

29 Claims, 3 Drawing Sheets

SOUNDPROOFING LAMINATED GLASS PANE

BACKGROUND OF THE INVENTION

1. Field of Invention

The invention relates to a soundproofing laminated glass pane which includes at least one plastic film giving it high damping or low stiffness properties. Such glass panes are generally intended for vehicles or buildings to decrease disturbance by external noise.

2. Discussion of the Background

In general, the soundproofing performance of glass panes based on silico-soda-lime float glass is improved if several glass sheets are combined together by means of a film of plastic, forming a laminated assembly. Special films or layers, developed for their acoustic performance, having a high damping coefficient or low stiffness, can be used to further improve the soundproofing. Unfortunately, these interlayers are often expensive, or have poor mechanical properties required for their conditions of use. For example, the mechanical properties are insufficient for safety windows for buildings or for motor-vehicle windows.

The soundproofing of a vehicle against aerodynamic noise has been improved by the use of a special resin in the laminated glass pane. European Patent EP-B-0,387,148 (equivalent of U.S. Pat. No. 5,368,917) proposes achieving an acoustic attenuation index by using a laminated glass pane whose interlayer possesses flexural damping $v=\Delta f/f_c$ greater than 0.15. The index does not differ, for any frequency above 800 Hz, by more than 5 dB from a reference index which increases by 9 dB per octave up to 2,000 Hz and by 3 dB per octave at higher frequencies. The value of $v$ is determined from a measurement carried out by exciting, by means of a shock, a laminated bar 9 cm in length and 3 cm in width made of a laminated glass in which the resin with a thickness of 2 mm is between two glass plates, each 4 mm in thickness, and by measuring $f_c$, the resonant frequency of the first mode, also called the "critical" frequency, and $\Delta f$, the width of the peak at an amplitude $A/\sqrt{2}$ in which A is the maximum amplitude at the frequency $f_c$. In this document, the interlayer sheets of the acoustic laminated glass panes made of the resin possessing these characteristics have large thicknesses, being 1.1 mm and 1.5 mm in the two examples cited.

To protect a building from road noise, European Patent EP-B-0,100,701 (U.S. equivalent Pat. No. 4,614,676) proposes an acoustic window comprising at least one laminated glass pane, characterized in that the resin of the laminated glass pane is such that a bar 9 cm in length and 3 cm in width consisting of a laminated glass comprising two 4-mm thick glass sheets joined together by a 2-mm layer of this resin has a critical frequency which differs by at most 35% from that of a glass bar having the same length, the same width and a thickness of 4 mm. The criterion adopted here for characterizing the resin is different, since here it is the "critical" frequency of a laminated bar, which varies with the stiffness of the resin, whereas in U.S. Pat. No. 5,368,917 it is the width of the "peak" of the same critical frequency which was the characteristic parameter, this varying with the damping of the resin of which the interlayer of the laminated glass pane is composed. Here too, the examples adopted use large thicknesses of resin, 2 mm.

These high-performance acoustic resins are expensive products, in particular because they are produced in small quantities. It would be desirable to reduce the thickness of the interlayer film, but still be able to keep the performance usually required of laminated glass panes, in particularly for safety.

It is also known to combine several films, each made of a different acoustic resin, to obtain an acoustic performance which combines the advantages of each of the resins taken alone, in particular the temperature range in which each resin is effective. U.S. Pat. No. 5,340,654, and several Japanese patent applications, especially JP 06-135,748, JP 03-124,441, JP 05-310,449 or JP 06-115,980, relate to these techniques. This type of assembly necessarily increases the thickness of the acoustic film.

In another field, laminated glass panes having electrical conductivity, or reflectivity or absorptivity of solar radiation, it is known to combine a thin support film of metallic or dielectric layers with polyvinyl butyral sheets between glass plates, to produce functional laminated glass panes. In U.S. Pat. No. 3,718,535 a support film made of polyethylene terephthalate (PET) polyester having a thickness of between 0.006 and 0.380 mm is covered with a thin metallic layer using vacuum deposition, evaporation or sputtering techniques. The support film is combined on both sides with two thermoplastic films, preferably made of polyvinyl butyral (PVB).

A more recent document, WO 94/21,838, discloses PVB-based laminated assemblies between glass sheets in which PVB sheets surround a PET film, with a thickness of, for example, 0.05 mm. The PET itself is covered with a set of alternating layers of metal (Ag covered with Au) and dielectric (especially indium oxide or indium tin oxide) in order to give the glass pane anti-solar or conductive properties.

SUMMARY OF THE INVENTION

An object of the present invention is to provide a laminated glass pane with good acoustic properties and correct mechanical strength.

Another object of the present invention is to provide a safety window, with a thickness of acoustic resin as small as possible.

The present invention provides a soundproofing laminated glass pane which includes at least two transparent rigid sheets, as well as at least one high-performance acoustic film, giving it damping and/or stiffness properties, in which the high-performance acoustic film is combined with at least one film having ordinary acoustic performance. The film having ordinary acoustic performance (ordinary standard film) is such that either:

when, in a thickness of 2 mm, it is combined in an assembly laminated with two 4-mm glass plates in order to form a laminated bar 9 cm in length and 3 cm in width and when the bar is excited by a shock, the resonant frequency of the first mode, $f_c$, differs by more than 35% from that of a bar made of monolithic glass, having the same length, the same width and a thickness of 4 mm; or when, in a thickness of at most 1 mm, it is combined in an assembly laminated with two 2.1-mm glass plates in order to form a laminated sheet whose acoustic attenuation index is measured and when the latter is shifted, for frequencies above 800 Hz, by more than 6 dB from a reference index which increases by 9 dB per octave up to 2,000 Hz and by 3 dB per octave at higher frequencies.

This film having ordinary acoustic performance is preferably made of polyvinyl butyral (PVB).

DETAILED DESCRIPTION OF THE INVENTION

Figure 1:
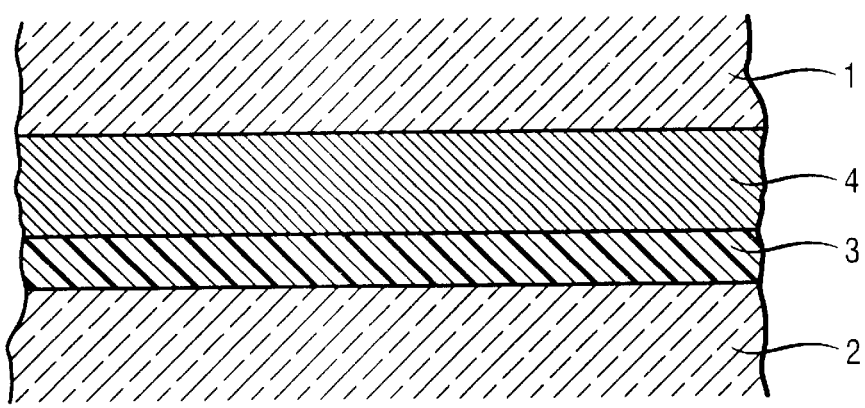
FIG. 1 represents a laminated glass pane of the present invention with juxtaposition of a sheet of acoustic resin and a sheet of standard resin.

The resins developed by organic chemists for acoustic applications are often chemically complex and their development has required lengthy tests involving experts in several scientific disciplines. Moreover, the markets in question are not very large, and it therefore follows that these products are often very expensive. The idea of combining such an acoustic resin with as small a thickness as possible, with an ordinary interlayer, one that is commonly used in laminated glass panes, such as polyvinyl butyral seems, a priori, absurd. It is in fact well known that, acoustically, as in a chain, the weakest link always acts alone. Under these conditions it would be expected that the combination of an acoustic resin with PVB would provide a laminated glass pane which is acoustically as poor as that of ordinary film (such as PVB) alone.

The Applicant ventured to try out the experiment, and the result is surprising: even when the acoustically ordinary film is substantially thicker than the film of acoustic resin, the acoustic results are maintained.

The technique of the present invention makes it possible to substitute an expensive acoustic film with an ordinary and inexpensive film, without any degradation in the acoustic properties. Furthermore, in general, an appreciable improvement in the mechanical strength properties, along with the entire range of additional properties which the ordinary film (such as PVB) in particular provides—colors, UV screening, light scattering, etc., is also provided, especially when PVB is used.

Preferably, the plastic film giving damping and/or stiffness properties is separated from the film having ordinary acoustic performance by an impermeable thin film. The impermeable thin film is advantageously based on polyethylene terephthalate (PET).

According to an alternative form, the plastic film giving stiffness properties is made of a resin such that the same bar 9 cm in length and 3 cm in width, consisting of a laminated glass comprising two glass sheets 4 mm in thickness joined together by a 2-mm layer of this resin, has a resonant frequency of the first mode, $f_c$, which differs by at most 35% from that of a glass bar having the same length, the same width and a thickness of 4 mm. According to a second alternative form, the plastic film giving damping properties is made of a resin such that, when in a thickness less than or equal to 1 mm, it is combined in a laminated assembly with two 2.1-mm glass plates in order to form a laminated sheet, the acoustic attenuation index of which is measured, the latter is shifted, for frequencies above 800 Hz, by less than 6 dB from a reference index which increases by 9 dB per octave up to 2,000 Hz and by 3 dB per octave at higher frequencies.

The first of these alternative forms is preferably used as building windows, especially for good protection against road noise. The second alternative form is preferably used in vehicles, especially to protect against aerodynamic noise.

Preferably the thickness of the at least one acoustic film, like the standard film, is greater than or equal to 0.38 mm.

In the present invention the impermeable thin film preferably includes one or more thin layers at its surface which modify its light reflection or transmission properties and/or its electrical conductivity. Also, at least one of the two transparent rigid sheets preferably includes, especially on its internal surface, one or more thin layers which modify its light reflection or transmission properties and/or its electrical conductivity.

Acoustic resins which are effective as interlayers for laminated glass panes are known to act either on the damping or on the stiffness of the glass panes which they equip.

For the acoustic expert, the vibration phenomena in laminated sheets are governed by laws which are quite analogous to those governing the mechanical combination of two masses joined together by a spring and a dashpot mounted in parallel. Just as the equations for the movements of the mass/spring/mass assembly allow the characteristic mechanical parameters of the spring (its stiffness) and of the dashpot (the damping) to be obtained, analysis of the mechanical behavior of a bar consisting of the combination of two glass plates, for example 4-mm plates joined together especially with 2 mm of the resin in question, makes it possible to obtain the parameters of the damping, v, and the stiffness, K, of the resin tested. The specialist can predict the acoustic effectiveness of laminated glass panes made with the resin in question.

Figure 4:
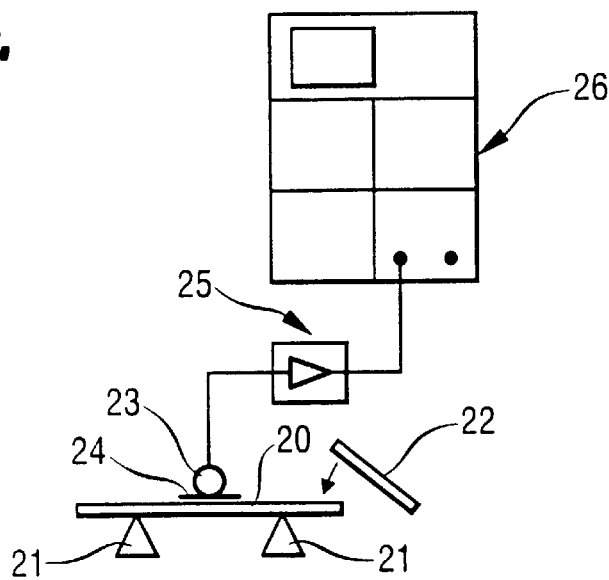
FIGS. 4, 5 and 6 show the method used to measure the damping and to define the stiffness of the acoustic resins.

A description will now be given, with reference to FIG. 4, of the first method which makes it possible to select a resin which can be used within the framework of the present invention and to define what is meant by "standard resin film" or "film having mediocre acoustic performance".

The energy acquired by an object subjected to a shock causes a vibration phenomenon and immediately after the shock the object which has become free vibrates according to its eigenmode. A vibration frequency is associated with each mode. The amplitude of the vibration depends on the initial excitation, that is to say on the spectral component of the shock (amplitude of the shock at the frequency studied) and on the area of impact of the shock, the modal deformation being of greater or lesser extent depending on whether the shock occurs at a vibration antinode or at a vibration node.

In order for an eigenmode to be excited the deformation caused at the point of impact must not lie on a vibration node of the mode, and the energy spectrum of the shock must have a component at the resonant frequency of the mode. The latter condition (2) is virtually always satisfied since a very short shock has a virtually uniform energy spectrum.

The first condition (1) is also usually satisfied and, for a bar free at both ends, all that is required is to tap one of the ends in order to excite all the modes, for example.

In reality, at the most only the first ten modes are able to be measured. The vibration energy acquired through a shock is dissipated over time, this happening more rapidly the more highly damped the material is. For a given material, the modes dissipate all the more quickly the higher the associated resonant frequency, so that after a certain time, for a certain period, only the first mode remains.

The measurement consists of analyzing the vibration frequencies of a bar subjected to a shock and in identifying the position of the resonant frequencies, frequencies for which the vibration amplitude is markedly greater than in the rest of the spectrum. In order to perform the measurement (FIG. 4), bars 20 having a length of 9 cm and a width of 3 cm, are used in succession. First, the bars are made of glass 4 mm in thickness, and then made of a 4/2/4 laminated glass in which 4-mm thick glass sheets are joined together with a 2-mm thick layer of the resin to be tested.

The bar 20 rests on two foam supports 21 placed approximately at the vibration nodes of the first mode (fundamental mode) of dynamic bending of the bar. The latter is excited by a shock exerted by striking one of its free ends with a small object, such as a rule. The transient response of the bar to this excitation is picked up by a microphone 23 located on a support 24 very close to the surface of the bar 20 at its middle (pressure antinode). The temporal signal picked up by the microphone 23 is amplified by the amplifier 25 and then analyzed in the frequency domain by a Fourier analyzer 26. Generally, ten or so tests are carried out for the same bar 20 so as to reduce the effect of external noise.

Figure 5:
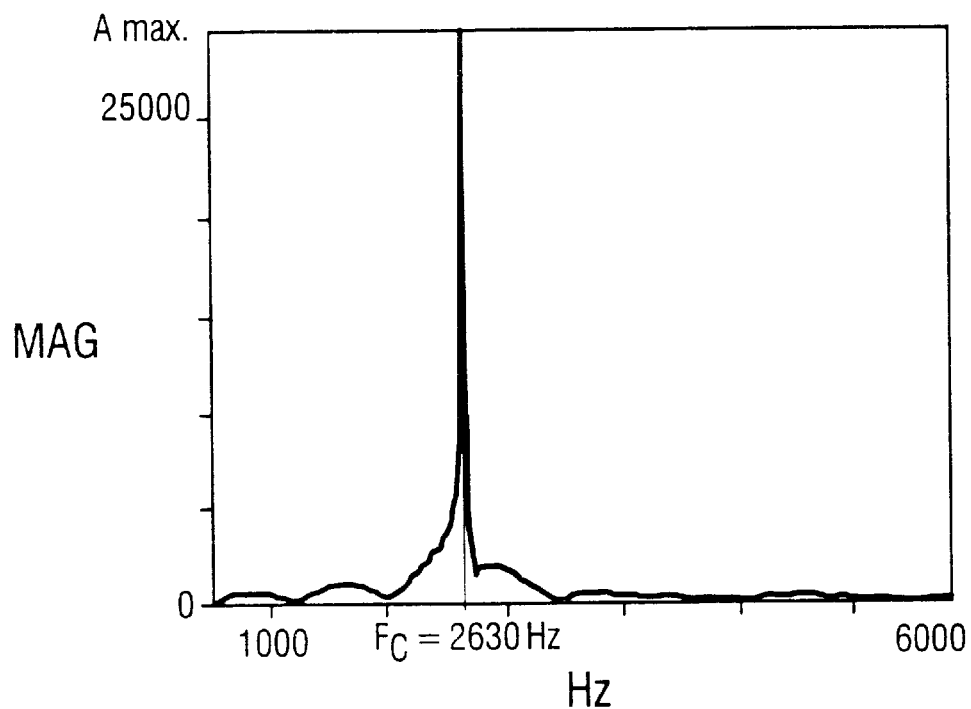
Figure 6:
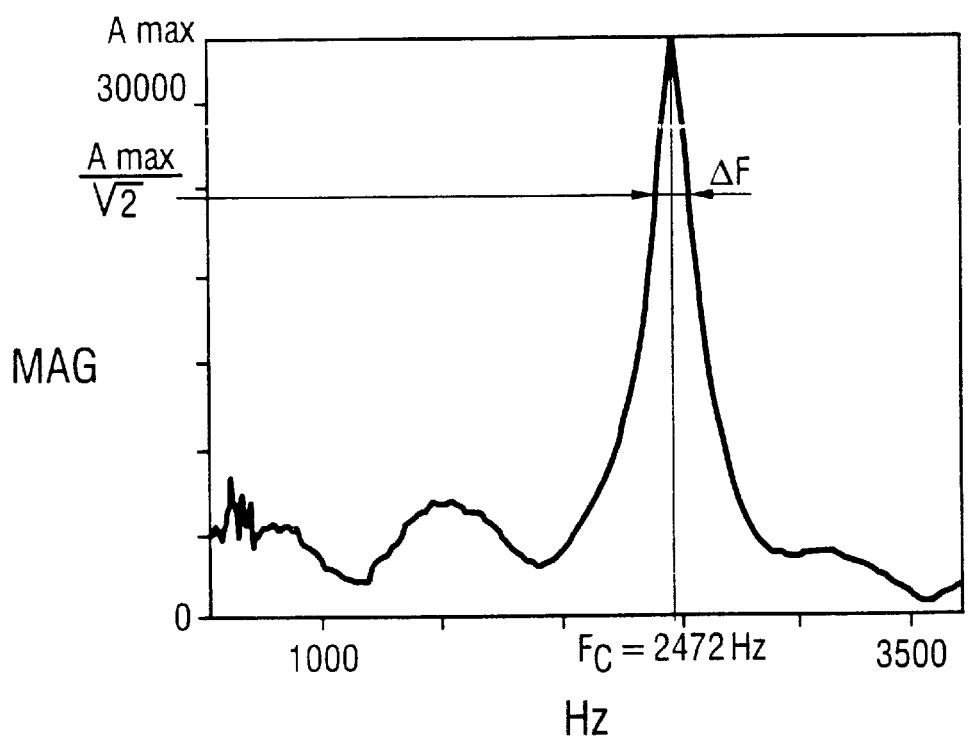

FIGS. 5 and 6 show the curves obtained, which represent the amplitude A of the vibrations as a function of their frequency for a monolithic glass bar, and for a bar of laminated glass comprising a resin to be tested within the framework of the present invention, respectively. This enables the resonant frequency of the fundamental mode of flexural vibration (critical frequency) to be accurately detected. In the examples shown, the critical frequency of the glass bar is 2630 Hz, while that of the laminated glass bar is 2472 Hz. In order to obtain the stiffness K of the resin tested, it is usually enough just to know the value of this "critical" frequency $f_c$, or more precisely the resonant frequency of the first mode of the bar, which is related to K.

From the point of view of the stiffness and therefore of the "critical" frequency $f_c$, the boundary between a laminated product which, from an acoustic standpoint, is ordinary and, in contrast, one which is effective lies in the region of a "critical" frequency of 3,550 Hz. Products made with resins whose $f_c$ is less than this value are acoustically high-performance products while laminated glass panes whose resin has an $f_c$ above 3,550 Hz are mediocre. This is the case for PVB-based laminates since, at a temperature of 20° C., this "critical" frequency is 4,500 Hz.

The test which has just been described and which is very simple to implement also makes it possible to determine the flexural damping, ν, of the bar 20, this being defined as the ratio $\Delta f/f_c$, where $\Delta f$ represents the frequency difference corresponding to an amplitude equal to that of the "critical" frequency $f_c$ divided by √2. It is the damping, ν, which enables the effective resins according to U.S. Pat. No. 5,368,917, hereby incorporated by reference, to be selected, these making it possible to obtain high-performance laminated glass panes for attenuating the noise of aerodynamic origin in vehicles. It is this criterion, that a laminated glass be effective against aerodynamic noise, which is adopted here.

Examples of such resins are described in U.S. Pat. No. 5,368,917 hereby incorporated by reference, and include compounds comprising thermoplastic resins resulting from the copolymerization of 80–98.5% by weight of vinyl chloride and 1–10% by weight of glucydyl methacrylate as well as 0.5–10% by weight ethylene. The resin may include 10–40% by weight of a plasticizer.

The transparent rigid sheets are preferably glass, and preferably have a thickness of 0.05–100 mm, more preferably 0.5–10 mm. The high-performance acoustic film, i.e. the plastic film which provides damping and/or stiffness properties, may have a thickness of 0.01–10 mm, more preferably 0.38–1 mm. The ordinary acoustic film may have a thickness of 0.01–10 mm, more preferably 0.38–2 mm. Finally, the barrier film, i.e. the impermeable thin film, preferably has a thickness of 0.001–1 mm, more preferably 0.01–0.1 mm.

The test consists of producing a laminated glass pane using two 2.1-mm glass plates and combining them with at most 1 mm of the resin to be tested, and then measuring the acoustic attenuation index of the laminated glass pane according to the ISO 140 standard. Each value obtained for frequencies above 800 Hz is then compared with that of a reference index which increases by 9 dB per octave up to 2,000 Hz and by 3 dB per octave at higher frequencies. In order to make this comparison, for each of the frequencies in question, the difference between the two index values is calculated. From all these deviations, the greatest and smallest are chosen and the difference between them is calculated. Half this latter difference represents the "deviation" between the two curves. If this deviation is less than 6 dB, the laminate in question and therefore the resin of which it is composed are acoustically very effective against the aerodynamic noise of a moving vehicle. In contrast, when this deviation is greater than 6 dB, the resin is considered to be acoustically mediocre.

Depending on the nature of the noise against which it is desired to be protected, i.e. noise of aerodynamic origin in a vehicle, road noise, vocal noise between adjacent rooms, etc., the condition to be satisfied by an effective acoustic resin in a laminated glass pane is defined by a "range" within which either its "critical" frequency, $f_c$, or the deviation between the curves which has just been defined, or both of these parameters, must lie. Within a family of polyvinyl acetal resins, described in the publication "*Effect of molecular structure of the interlayer on the transmission loss of laminated glass*" presented at "Internoise 94" (Yokohama, Japan, 29–31 Aug. 1994), there are several polymers which allow both the above criteria to be satisfied simultaneously.

FIG. 1 shows a laminated glass pane according to the invention. It consists of two sheets of transparent rigid material, such as polycarbonate or polymethyl methacrylate, or, preferably, two plates of glass 1 and 2. Their thickness is not critical, and may be defined for reasons outside the invention, such as for example, the regulations regarding facade windows or the practical requirements of the motor-vehicle industry. The film of acoustic resin is shown at 3. It is combined with a layer of a conventional resin in order to make laminated-glass interlayers, such as standard polyurethane or polyvinyl butyral 4, these being acoustically normal, conventional products which have not been at all modified to give them particular stiffness or damping properties. However, they may be conventional films, such as PVB films, although colored, scattering or UV-screening, but, from an acoustic standpoint, they are conventional (a PVB version for buildings or an HI version for, in particular, motor-vehicle windscreens). The two films are combined by the usual means in this kind of industry, namely coextrusion, calendaring, etc.

Having generally described this invention, a further understanding can be obtained by reference to certain specific examples which are provided herein for purposes of illustration only and are not intended to be limiting unless otherwise specified.

EXAMPLES

Many acoustic tests have been carried out with combinations of the above type using different resins by producing specimens having dimensions of 1.48×1.23 m² with identical glass thicknesses for the two plates, 1.6 and 2.1 mm, respectively.

The thicknesses (in mm) of the two combined films in the case of PVB are described in Table 1, in succession:

TABLE 1

|  | Acoustic resin | PVB |
|---|---|---|
| Comparative Example 1 | — | 0.76 |
| Comparative Example 2 | 0.50 | '3 |
| Example 3 | 0.50 | 0.38 |
| Comparative Example 4 | 1.00 | — |

Figure 3:
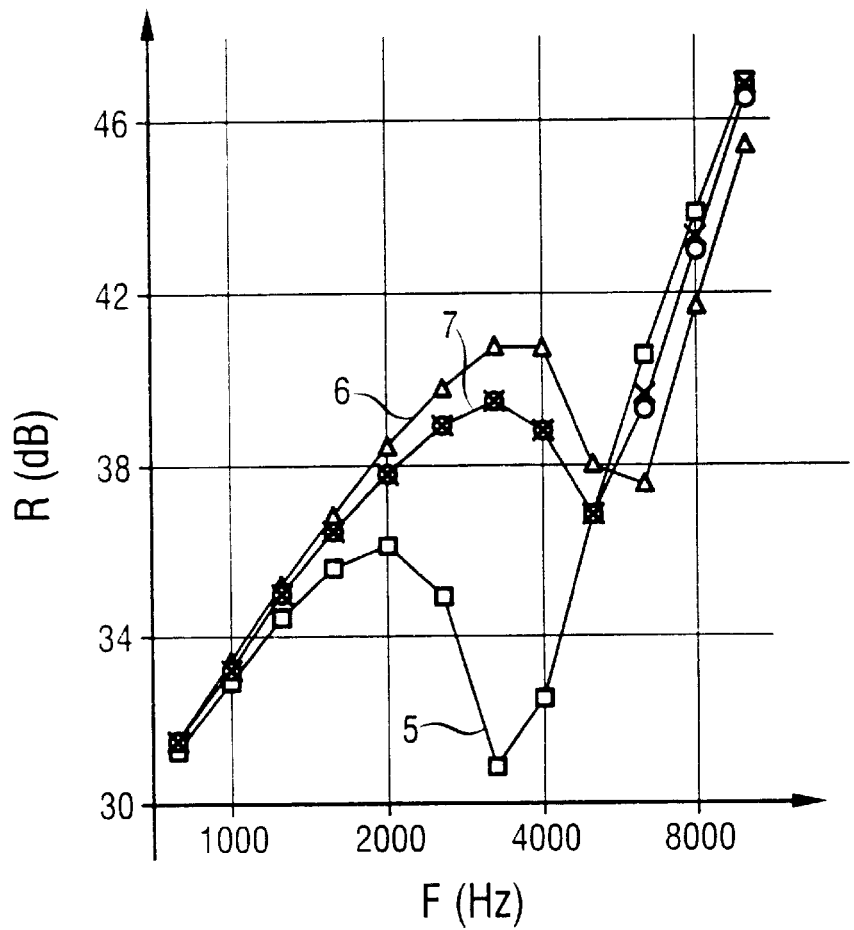
FIG. 3 shows the results of the measurements of the acoustic attenuation index on a glass pane of the present invention.

FIG. 3 shows the results of the acoustic attenuation indices according to the ISO 140 standard with the two 2.1-mm glass plates for Comparative Example 1 (5), for Comparative Example 4 (6) and for the acoustic resin alone of Comparative Example 2 (7). This curve with the circles is virtually coincident with the curve of Example 3 according to the present invention, the measurement points of which are depicted by crosses.

The above measurements show that a laminate with a combination consisting of 0.50 mm of acoustic resin and 0.38 mm of PVB is not inferior to that consisting of 0.50 mm of acoustic resin alone, and is somewhat superior to that made with 0.76 mm of PVB. Tests carried out on specimens comprising two 1.6-mm glass plates gave curves of similar appearance, just as spectacular and surprising.

Figure 2:
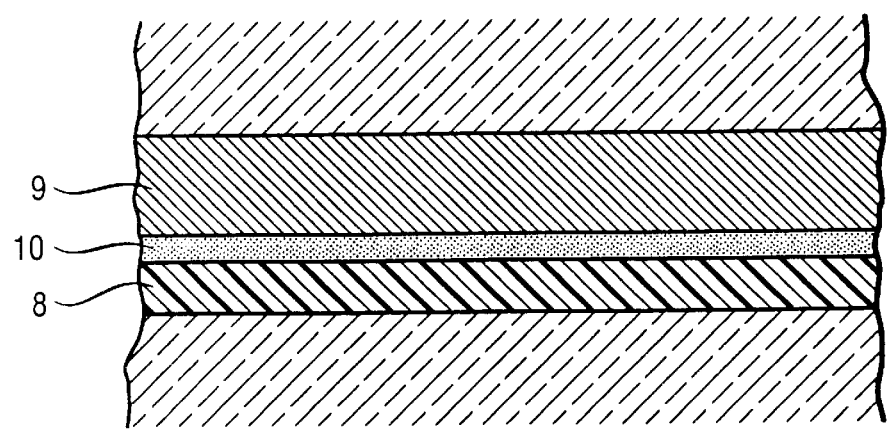
FIG. 2 shows the same sheets as FIG. 1, but with an impermeable thin film between the sheets.

FIG. 2 shows a second type of laminated glass pane in which the two films, the acoustic film 8 and the standard PVB film 9 are separated by a thin film 10 made of a material intended to ensure chemical separation of the two other films 8 and 9. This chemical separation is preferable because most films intended to form interlayers of laminated glass panes contain, in addition to the base polymer or polymers, plasticizers. When two or more films are combined, they may contain plasticizers which are mutually incompatible or incompatible with the polymer of the other film. In this case, a separation material or plasticizer barrier must be placed between the films. For example, a thin (50 μm is suitable) film of polyethylene terephthalate is suitable.

Acoustic tests were also carried out on such separator films, their thicknesses in mm shown in Table 2:

TABLE 2

|  | Acoustic resin | PVB | PET |
|---|---|---|---|
| Example 5 | 0.50 | 0.38 | 0.050 |
| Example 6 | 0.50 | 0.76 | 0.050 |

The acoustic results are surprising—no difference from Example 3 of the previous tests is observed. In the case of 2.1-mm thick glass, the acoustic attenuation indices are coincident with curve (7) in FIG. 3.

A test was carried out on two 0.38-mm PVB films placed on either side of the acoustic resin film. Once again, the acoustic result was the same as before (Example 6); it is thus observed that, regardless of whether the conventional film, such as PVB, is split into two 0.38 mm films or whether it is made as a single 0.76 mm film, the effect is the same since here the film has no acoustic function.

In order to quantify the acoustic comfort in a moving vehicle, U.S. Pat. No. 5,368,917 proposes, as mentioned earlier, comparing the acoustic attenuation index at each frequency with a theoretical index which increases by 9 dB per octave up to 2,000 Hz and by 3 dB/octave at higher frequencies. This reference also specifies defining a difference in the extremes, i.e., choosing from the list of differences in the indices, frequency by frequency, the greatest difference G and the smallest difference S and taking their difference, G-S. This deviation takes into account the comfort resulting from the use of the glass pane in a vehicle. The same document also suggests using the standard deviation of the above differences, σ, which is representative of the emergence of disagreeable frequencies within a uniform spectrum. These criteria were compared for the glass panes of the invention in 2.1 mm-x-2.1 mm thicknesses, compared to the same glass panes equipped either with PVB alone (Comparative Example 1) or with acoustic resin alone (Comparative Example 2). Table 3 gives the results:

TABLE 3

|  | difference in the extremes (dB) | σ (dB) |
|---|---|---|
| 0.76 PVB (comp. Ex. 1) | 14 | 4.46 |
| 0.50 acoust. res. (comp. Ex. 2) | 10 | 2.85 |
| 0.50 acoust. res. +0.38 PVB (Ex. 3) | 10 | 2.87 |
| 0.50 ac. res. +PET +0.38 PVB (Ex. 5) | 10 | 2.91 |
| 0.50 ac. res. +PET +0.76 PVB (Ex. 6) | 11 | 2.99 |

In the "difference in the extremes" column, it may be seen that the comparison between the acoustic resin (Comparative Example 2) and the acoustically mediocre product (Comparative Example 1) gives, for the acoustic resin, a deviation in the curves (½ the difference in the extremes) of 5 whereas, for the PVB, it is 7. It is observed that the combinations, combining acoustic resin with PVB, are virtually at a level for laminated glass panes made with the acoustic resin alone. They are appreciably superior to those using PVB alone, in particular with regard to the emergence of disagreeable frequencies (the σ value).

The results of the above acoustic measurements, just as for the curves of the acoustic attenuation indices which are used to obtain them (FIG. 3), make it possible to see the effectiveness of the novel solution of the present invention. With the present invention, it is possible to have, in the same laminated glass pane, acoustic protection combined with all the performance characteristics which the PVB affords: anti-break-in behavior, UV screening, various colors, scattering effects, etc. Likewise, by combining an acoustic resin with a resin which is effective from another standpoint (polyurethane, polyvinyl acetate, etc.), it is possible for the two functions to be additive.

The present invention makes possible the combination of a high-performance acoustic resin with one or more conventional films. The conventional films, which have been manufactured on an industrial scale for many years, in particular PVB, exhibit optimized performance characteristics, such as adhesion, temperature withstand, impact strength, etc., making them suitable for all kinds of uses. In most cases, they are capable of adhering correctly (neither too much nor too little, and over a range of use temperatures) to many layers, such as layers prepared by chemical deposition (pyrolysis or CVD) or by vacuum deposition. In some cases, these are layers which have been modified in order to obtain the desired adhesion to PVB (see, for example, Application DE 4,215,337 or Application EP-A-0,433,136).

A preferred embodiment of the present invention makes it possible to avoid any contact between these resins and the layers by virtue of the interposition of a film which is acoustically ordinary but which has properties of adhesion to the layers. This avoids any unknown problems resulting from the contact between the acoustically high-performance resins and the layer. Such problems would normally require extensive study and modifications to prevent.

In one of its alternative forms, the present invention provided for the use of an impermeable film placed between the acoustic resin and the PVB. Such a film is normally introduced in order to chemically separate the two functional films, but it may also perform another role and thus provide the laminated glass pane with a new function. Examples include an anti-solar function or an electrical conduction function. These functions may be obtained by depositing stacks of thin layers on the thin film, preferably polyethylene terephthalate (PET) thin film, these layers are usually vacuum-deposited and comprising metallic layers and dielectric layers, especially oxide-based layers. U.S. Pat No. 3,718,535, hereby incorporated by reference, discloses a heating laminate by equipping a PET film with a gold-based metallic layer and with current-supply strips.

When the impermeable film of the present invention, in particular a PET film, is covered with systems of various thin layers, it ensures that the laminated glass pane according to the present invention retains all its acoustic properties, but also enables the laminate to be easily converted into an anti-solar window or into an electrically conductive window (for heating, for radar screening, as an alarm window, etc.).

Obviously, numerous modifications and variations of the present invention are possible in light of the above teachings. It is therefore to be understood that within the scope of the appended claims, the invention may be practiced otherwise than as specifically described herein.

The priority document of the present application, French patent application 95 10837, filed on Sep. 15, 1995, is hereby incorporated by reference.

What is claimed as new and desired to be secured by Letters Patent of the United States is:

1. A laminated pane, comprising:
   (i) at least two transparent rigid sheets,
   (ii) at least one high-performance acoustic film, and
   (iii) at least one ordinary standard film,
   wherein, either
   said at least one ordinary standard film, when in a thickness of 2 mm, combined in an assembly laminated with two 4-mm glass plates in order to form a laminated bar 9 cm in length and 3 cm in width and the bar is excited by a shock, has a resonant frequency of the first mode, $f_c$, which differs by more than 35% from that of a bar made of monolithic glass, having the same length, the same width and a thickness of 4 mm; or
   said at least one ordinary standard film, when in a thickness of at most 1 mm, combined in an assembly laminated with two 2.1-mm glass plates to form a laminated sheet, has an acoustic attenuation index shifted, for frequencies above 800 Hz, by more than 6 dB from a reference index which increases by 9 dB per octave up to 2,000 Hz and by 3 dB per octave at higher frequencies.

2. The laminated pane of claim 1, wherein said ordinary standard film comprises polyvinyl butyral.

3. The laminated pane of claim 1, further comprising an impermeable film, between at least one of said high-performance acoustic films and at least one of said ordinary standard films.

4. The laminated pane of claim 3, wherein said impermeable film comprises polyethylene terephthalate.

5. The laminated pane of claim 1, wherein said at least one high-performance acoustic film, when in a thickness of 2 mm, combined in an assembly laminated with two 4-mm glass plates in order to form a laminated bar 9 cm in length and 3 cm in width and the bar is excited by a shock, has a resonant frequency of the first mode, $f_c$, which differs by at most 35% from that of a bar made of monolithic glass, having the same length, the same width and a thickness of 4 mm.

6. The laminated pane of claim 1, wherein said at least one high-performance acoustic film, when in a thickness of at most 1 mm, combined in an assembly laminated with two 2.1-mm glass plates to form a laminated sheet, has an acoustic attenuation index shifted, for frequencies above 800 Hz, by less than 6 dB from a reference index which increases by 9 dB per octave up to 2,000 Hz and by 3 dB per octave at higher frequencies.

7. The laminated pane of claim 5, wherein said at least two transparent rigid sheets are two sheets comprising glass, and said at least one high-performance acoustic film is one film with a thickness of at least 0.38 mm.

8. The laminated pane of claim 6, wherein said at least two transparent rigid sheets are two sheets comprising glass, and said at least one high-performance acoustic film is one film with a thickness of at least 0.38 mm.

9. The laminated pane of claim 7, wherein at least one of said ordinary standard films has a thickness of at least 0.38 mm.

10. The laminated pane of claim 8, wherein at least one of said ordinary standard films has a thickness of at least 0.38 mm.

11. The laminated pane of claim 3, further comprising at least one layer, on said impermeable film, which modifies at least one property of said impermeable film selected from the group consisting of light reflection, light transmission and electrical conduction.

12. The laminated pane of claim 1, further comprising at least one layer, on at least one of said transparent rigid sheets, which modifies at least one property of said transparent rigid sheets selected from the group consisting of light reflection, light transmission and electrical conduction.

13. A window, comprising the laminated pane of claim 1.

14. A window, comprising the laminated pane of claim 9.

15. A window, comprising the laminated pane of claim 10.

16. A multilayer assembly, comprising p1 (i) at least one high-performance acoustic film, and
   (ii) at least one ordinary standard film,
   wherein, either
   said at least one high-performance acoustic film, when in a thickness of 2 mm, combined in an assembly laminated with two 4-mm glass plates in order to form a laminated bar 9 cm in length and 3 cm in width and the bar is excited by a shock, has a resonant frequency of the first mode, $f_c$, which differs by at most 35% from that of a bar made of monolithic glass, having the same length, the same width and a thickness of 4 mm; or
   said at least one high-performance acoustic film, when in a thickness of at most 1 mm, combined in an assembly laminated with two 2.1-mm glass plates to form a laminated sheet, has an acoustic attenuation index shifted, for frequencies above 800 Hz, by less than 6 dB from a reference index which increases by 9 dB per octave up to 2,000 Hz and by 3 dB per octave at higher frequencies.

17. The multilayer assembly of claim 16, wherein said ordinary standard film comprises polyvinyl butyral.

18. The multilayer assembly of claim 16, further comprising an impermeable film, between at least one of said high-performance acoustic films and at least one of said ordinary standard films.

19. The multilayer assembly of claim 18, wherein said impermeable film comprises polyethylene terephthalate.

20. A method, comprising:

installing, into a motor vehicle, a window comprising the laminated pane of claim 1.

21. A film, comprising:

(i) at least one high-performance acoustic layer, and (ii) at least one ordinary standard layer, wherein, either said at least one ordinary standard layer, when in a thickness of 2 mm, combined in an assembly laminated with two 4-mm glass plates in order to form a laminated bar 9 cm in length and 3 cm in width and the bar is excited by a shock, has a resonant frequency of the first mode, $f_c$, which differs by more than 35% from that of a bar made of monolithic glass, having the same length, the same width and a thickness of 4 mm; or said at least one ordinary standard layer, when in a thickness of at most 1 mm, combined in an assembly laminated with two 2.1-mm glass plates to form a laminated sheet, has an acoustic attenuation index shifted, for frequencies above 800 Hz, by more than 6 dB from a reference index which increases by 9 dB per octave up to 2,000 Hz and by 3 dB per octave at higher frequencies.

22. The film of claim 21, wherein said ordinary standard layer comprises polyvinyl butyral.

23. The film of claim 21, further comprising an impermeable layer, between at least one of said high-performance acoustic layers and at least one of said ordinary standard layers.

24. The film of claim 23, wherein said impermeable layer comprises polyethylene terephthalate.

25. The film of claim 21, wherein said at least one high-performance acoustic layer, when in a thickness of 2 mm, combined in an assembly laminated with two 4-mm glass plates in order to form a laminated bar 9 cm in length and 3 cm in width and the bar is excited by a shock, has a resonant frequency of the first mode, $f_c$, which differs by at most 35% from that of a bar made of monolithic glass, having the same length, the same width and a thickness of 4 mm.

26. The film of claim 21, wherein said at least one high-performance acoustic layer, when in a thickness of at most 1 mm, combined in an assembly laminated with two 2.1-mm glass plates to form a laminated sheet, has an acoustic attenuation index shifted, for frequencies above 800 Hz, by less than 6 dB from a reference index which increases by 9 dB per octave up to 2,000 Hz and by 3 dB per octave at higher frequencies.

27. The film of claim 25, wherein said at least one high-performance acoustic layer is one layer with a thickness of at least 0.38 mm.

28. The film of claim 27, wherein at least one of said ordinary standard layers has a thickness of at least 0.38 mm.

29. The film of claim 23, further comprising at least one layer, on said impermeable layer, which modifies at least one property of said impermeable layer selected from the group consisting of light reflection, light transmission and electrical conduction.

* * * * *

UNITED STATES PATENT AND TRADEMARK OFFICE
CERTIFICATE OF CORRECTION

PATENT NO. : 5,773,102  
APPLICATION NO. : 08/710328  
DATED : June 30, 1998  
INVENTOR(S) : Marc Rehfeld Page 1 of 1

It is certified that error appears in the above-identified patent and that said Letters Patent is hereby corrected as shown below:

In the Specification

Column 7, line 6, "Comparative Example 2    0.50    '3" should read:
 --Comparative Example 2    0.50    — --.

Signed and Sealed this  
Fourteenth Day of April, 2015

Michelle K. Lee  
*Director of the United States Patent and Trademark Office*